US009554252B2

(12) United States Patent
Arney-Cimino (10) Patent No.: US 9,554,252 B2
(45) Date of Patent: Jan. 24, 2017

(54) METHOD AND SYSTEM FOR COORDINATING VISITS

(71) Applicant: Kate Arney-Cimino, North Hollywood, CA (US)

(72) Inventor: Kate Arney-Cimino, North Hollywood, CA (US)

( * ) Notice: Subject to any disclaimer, the term of this patent is extended or adjusted under 35 U.S.C. 154(b) by 0 days.

(21) Appl. No.: 14/329,020

(22) Filed: Jul. 11, 2014

(65) Prior Publication Data

US 2016/0014567 A1    Jan. 14, 2016

(51) Int. Cl.
| | |
|---|---|
| H04W 24/00 | (2009.01) |
| H04W 4/02 | (2009.01) |
| H04W 4/20 | (2009.01) |
| G06Q 10/10 | (2012.01) |
| G06Q 50/00 | (2012.01) |

(52) U.S. Cl.
CPC ........... *H04W 4/028* (2013.01); *G06Q 10/109* (2013.01); *G06Q 50/01* (2013.01); *H04W 4/206* (2013.01)

(58) Field of Classification Search
CPC ........ H04W 4/02; H04W 4/021; H04W 4/022; H04W 4/023; H04W 4/025; H04W 4/12; H04W 68/00; H04W 68/005; H04W 68/04; H04W 4/203; H04W 4/206; H04W 4/208

USPC ...... 455/403, 404.1, 414.1, 412.1, 417, 420, 455/456.1, 456.2, 456.3, 567
See application file for complete search history.

(56) References Cited

U.S. PATENT DOCUMENTS

| | | | |
|---|---|---|---|
| 8,930,820 B1* | 1/2015 | Elwell | G06F 17/60 705/319 |
| 8,958,537 B1* | 2/2015 | Saylor | 379/207.16 |
| 9,413,794 B1* | 8/2016 | Saylor | H04L 65/4076 |
| 2008/0070593 A1* | 3/2008 | Altman et al. | 455/457 |
| 2013/0095857 A1* | 4/2013 | Garcia | H04W 4/02 455/456.3 |
| 2013/0325948 A1* | 12/2013 | Chen et al. | 709/204 |
| 2014/0039840 A1* | 2/2014 | Yuen et al. | 702/189 |
| 2014/0156387 A1* | 6/2014 | Bruich | G06Q 30/0246 705/14.45 |
| 2015/0058235 A1* | 2/2015 | Kahan et al. | 705/319 |

* cited by examiner

*Primary Examiner* — Jean Gelin
(74) *Attorney, Agent, or Firm* — Omni Legal Group; Omid E. Khalifeh (57) ABSTRACT

A method and system are provided for coordinating visits to loved ones incapable of leaving their particular place of domicile. A temporal and location dependent event notification system is provided that allows users of mobile device to be networked to one another and receive updates centered around visits to the debilitated loved one. Following the occurrence of a number of predetermined events, the system and method presents a message to the network members suggesting that members perform an action.

15 Claims, 7 Drawing Sheets

METHOD AND SYSTEM FOR COORDINATING VISITS

CROSS-REFERENCE TO RELATED APPLICATIONS

None.

NOTICE OF COPYRIGHT AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

TECHNICAL FIELD

The present invention relates generally to the field of mobile wireless communication, more particularly to a method and system for coordinating visits to a loved one for a group of mobile subscribers where location and time determination and notification meet certain value criteria.

DISCUSSION OF THE RELATED ART

Wireless communication devices, such as smartphones, have expanded far beyond simply providing a means of communication. Many telephones come equipped with a variety of features to enhance productivity, to entertain, and even to document. Mobile phones now include digital cameras comprising video and voice reordering capabilities. Such devices further include means for storing and accessing any type of media which the operator wishes to record. In addition, smartphones now have the ability to run application programs specifically designed for phone-based operating systems.

With the proliferation of individual location tracking such as Global Positioning System (GPS) in mobile electronic device, various proposals to utilize this technology for performing geographically-based functions have emerged. One such example is U.S. Pat. No. 7,164,986 which discloses a method and system to track devices and ensure their route adherence via geofencing.

Location tracking capabilities in wireless networks and handsets, methods have also emerged to extend such geographic locating capabilities to cellular devices and leverage information that may exist in the wireless network. U.S. Pat. No. 7,254,388 discloses a system for mobile station-assisted triggers and service methods wherein a location assistant on the handset (e.g., a module and application) plays an assisting role in simplifying and making more efficient the task of identifying whether the mobile device approached, entered or exited a certain geographical zone, consequently triggering certain actions.

Furthermore, U.S. Pat. Nos. 7,848,765 and 7,870,229 have extended these concepts for location-based services (LBS), such as for the support of location-based advertising or geographic zone-based services. U.S. Pat. No. 8,019,532 focuses on defining a specific boundary (e.g., a polygon or shape) about a point of interest (POI) on a map for the purposes of offering services to a mobile device, in particular a smartphone with location determination capabilities and the ability to save such contours for the purposes of acting upon them.

In all of the aforementioned references, the role of the mobile electronic device is to actively define a geographical boundary while utilizing the devices computing power and reduce the number of required communication and location determination transactions. Those transactions are required to support and operate the intended application, such as geographically-based services or alerts.

Advancements in the art have led to more sophisticated technologies being incorporated in mobile devices like smartphones. The management and optimization of these capabilities would allow for more sophisticated locating tracking and notification methods that would be particularly desirous to those with family and loved ones incapable of independent travel and who, therefore, must be visited in their own place of dwelling.

As people's lives become increasingly busy, it also becomes more difficult to track the number of visits paid to a loved one, particularly by those who care for them most. By way of example, a family with their grandmother in a convalescent hospital will find it challenging to coordinate their visits in a manner which ensures grandmother is being seen regularly and doesn't go too long without the affection of those dear to her.

It would be desirous to utilize the advanced technologies available in modern electronics and allow individuals to automatically record visits with such a disabled family member. Moreover, with the advent of social networks and instant communications, a person may want to communicate to members of a given network that they have visited grandmother at a particular time. This would allow other members of that network to coordinate their visits in a manner that will optimize the number of visits paid to grandmother.

It would be even more desirous if the mobile electronic device came equipped with a means of documenting interactions utilizing the devices memory and recording capabilities. Such a means would include a journal for recording conversations, calendar to document visits, along with various topics and questions to ask while providing various ways of storing the answers like voice and video recording.

There exists a need for a system and method that utilizes the aforementioned technologies for enabling users to create social networks centered around a particular friend or family member needing visitors, allows for automated notifications to network members about visits, sends out reminder messages, and provides a plurality of activities members may engage in while visiting the friend or family member. The present invention effectuates these needs.

SUMMARY

A method and system are provided for coordinating visits to loved ones incapable of leaving their particular place of domicile. A temporal and location dependent event notification system is provided that allows users of mobile device to be networked to one another and receive updates centered around visits to the debilitated loved one. Following the occurrence of a number of predetermined events, the system and method presents a message to the network members suggesting that members perform an action. The message is designed to encourage users to perform an act such as visiting their loved one because a prolonged period of time has lapsed during which none of the network members had been detected at their dwelling place. The ultimate result is providing a better and more coordinated way in which a group of friends and family can maximize the amount of time spent with a disabled loved one and facilitate their desire for ensuring she or he receives the best care.

Briefly described, one embodiment, among others, is a location attendance monitoring and tracking system that comprises a mobile device operative to: create a network of trusted members by collecting identification information corresponding to members of a network centered around a particular individual; in one embodiment, this individual may be someone, hereafter known as the network center, confined to a medical facility or that is otherwise unable to leave their dwelling place to be around others. The mobile device may further receive information from integrated positioning technology, such as a Global Positioning System (GPS), about the domicile of the network center.

Upon the occurrence of a particular first event, such as the attendance of a first network member at the the aforementioned domicile, the mobile device stores this information along with temporal information about the first event; and responsive to determining that the current location of the first of the members corresponds to a visit to the network center, enables attendance information to be sent to other members of the network indicating that the first of the members was at the domicile on a particular day at a particular time.

In one embodiment of the present invention, a computer-implemented method is used to establish a zone of relevance comprising the area in or around the domicile of the network center within a particular radius for locating a particular network member and making a user notification decision.

The method comprises the steps of obtaining application specific information from an application service provider; extracting geographic information from a geographical database based on information obtained from the application; obtaining temporal information from the computer; obtaining the network members information and real time information related to said member; and notifying another network member, based on predetermined criteria for a determined type of notification.

Another embodiment is a computer-readable medium having stored thereon computer-executable instructions, which, when executed by a computer processor, enables performance of the method comprising: receiving member information corresponding to members of a social network; receiving information corresponding to the identity and domicile of a network center, wherein at least a first of the members is allowed to send an invitation to at least one other individual giving the second individual the opportunity to join the network; and responsive to determining that the current location of any of the network members corresponds to the domicile of the network center, enabling attendance information to be viewed on the mobile device of any other network member indicating that a given network member has visited the network center on a particular day at a particular time.

In addition to the aforementioned automatic means of recording a network member visit to the network center, members will be given the opportunity to manually enter the time and date of a particular visit in the mobile device. Subsequently, members can choose to share this information with others and keep them apprised of their visit. The calendar entries may further comprise notes, alerts, and specific tasks pertaining to the network center that other members may also find valuable.

In one embodiment, there is further provided a method for the members of the network to gather information relevant to the creation of a family tree, organizing the information, and, in one embodiment, displaying it in the form of a family tree, comprising the steps of providing network members with a series of questions to be asked of the network center, allowing the members to enter information into their mobile device based on the answers given by the network center, and storing that information on a family tree viewable on the mobile devices of all other network members.

In yet another embodiment, a journal creation and management component provides tools for network members to create and store member-generated content in the form of an online journal. This member-generated content can be automatically tagged with location information provided by a location-aware mobile communication device. Such geo-tagged journal information can be shared with network members to share information learned about the network center during a particular visit. Examples may include, what was the last meal they ate or if there is something in particular the network center would appreciate a network member bring for them on their next visit. The member-generated content can be provided in the form of text or graphic messages, pictures, audio/video clips, and the like.

Similarly, member-generated content can be captured by the mobile device in the form of pictures, audio/video clips, and the like may be stored in digital albums created by the network members to document their time with the network center. Such albums may be viewable by all the network members or labeled as private and made accessible only by designated members.

Furthermore, social networking sites allow users to upload and share photographs and notes with friends, generate personalized newsfeeds, and monitor and interact with the activities of users' friends; and to request and establish connections with other users on the social networking site by becoming friends within the user's social network, for example FACEBOOK®, INSTAGRAM®, and TWITTER®. Embodiments of the present invention include methods, apparatuses and computer-readable media whereby members may select at least one particular social network to receive information pertaining to their time spent with the network center. After members select which social media platform or platforms to publicize their content on, the social media-based platform may generate a post appearing on a newsfeed page of the social network. The post is generated if the user chooses to publish a particular type of member generated content such as a picture with the network center, voice recording, video, or journal entry. This post may contain simply text telling readers about the network center or various different types of media which may accompany the text.

In one embodiment, a system is provided for initiating a communication session between member one member and another. The system includes a mobile chat application executable by a server to receive data from the mobile device of one member and is operable to allow the network member to communicate directly with another network member via the Internet.

The system may further provide means of storing information pertinent to the health and well being of the network center. Such information includes, but is not limited to, medical information, social services information, and specific information about the healthcare professional or professionals responsible for the care of the network center. It may further comprise pertinent information about what particular facility the network center is domiciled in such as address, visiting hours, telephone numbers, etc.

These and other objects, features, and advantages of the present invention will become apparent in the following detailed description of the present embodiment thereof when read in conjunction with the accompanying drawings wherein the same reference numerals denote like or similar parts throughout the several views.

Although the description that follows contains many specificities, these should not be construed as limiting the scope of the embodiments but as merely providing illustrations of some of several embodiments. Thus the scope of the embodiments should be determined by the claims that are appended and their legal equivalents, rather than by the examples given. Those skilled in the art to which this invention pertains will be able to devise other forms thereof within the ambit of the appended claims.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

Figures

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Method and systems for coordinating visits are provided that, in some embodiments, permit mobile device users to form a social network of members with a common interest in at least one person, the network center, confined to a medical facility or that is otherwise unable to leave their dwelling place to be around others.

By way of example, such an individual may be an elderly grandmother whose declining health has forced her into a convalescent hospital away from her family and loved ones. A social network of members interested in grandmother's well being can be created to, among other things, monitor member visits to grandmother's convalescent hospital and attendance information can be sent to the other members when a determination is made that a prolonged period has lapsed during which none of the network members has visited grandmother.

In some embodiments, the mobile device includes location determination capability. The calendar is implemented as a function of a social network server that facilitates the social network. Additionally, the attendance information can be configured as a user-defined message that is automatically sent from a mobile device in some embodiments, or as a status update posted to a website hosted by a social network server, among other configurations.

A description of an embodiment of a method and system for coordinating visits of members in a networked environment is now described followed by a discussion of the operation of various components within the system. In this regard, FIG. 1 is a block diagram of a networked environment in which an exemplary embodiment of a system for coordinating visits is implemented.

Figure 1:
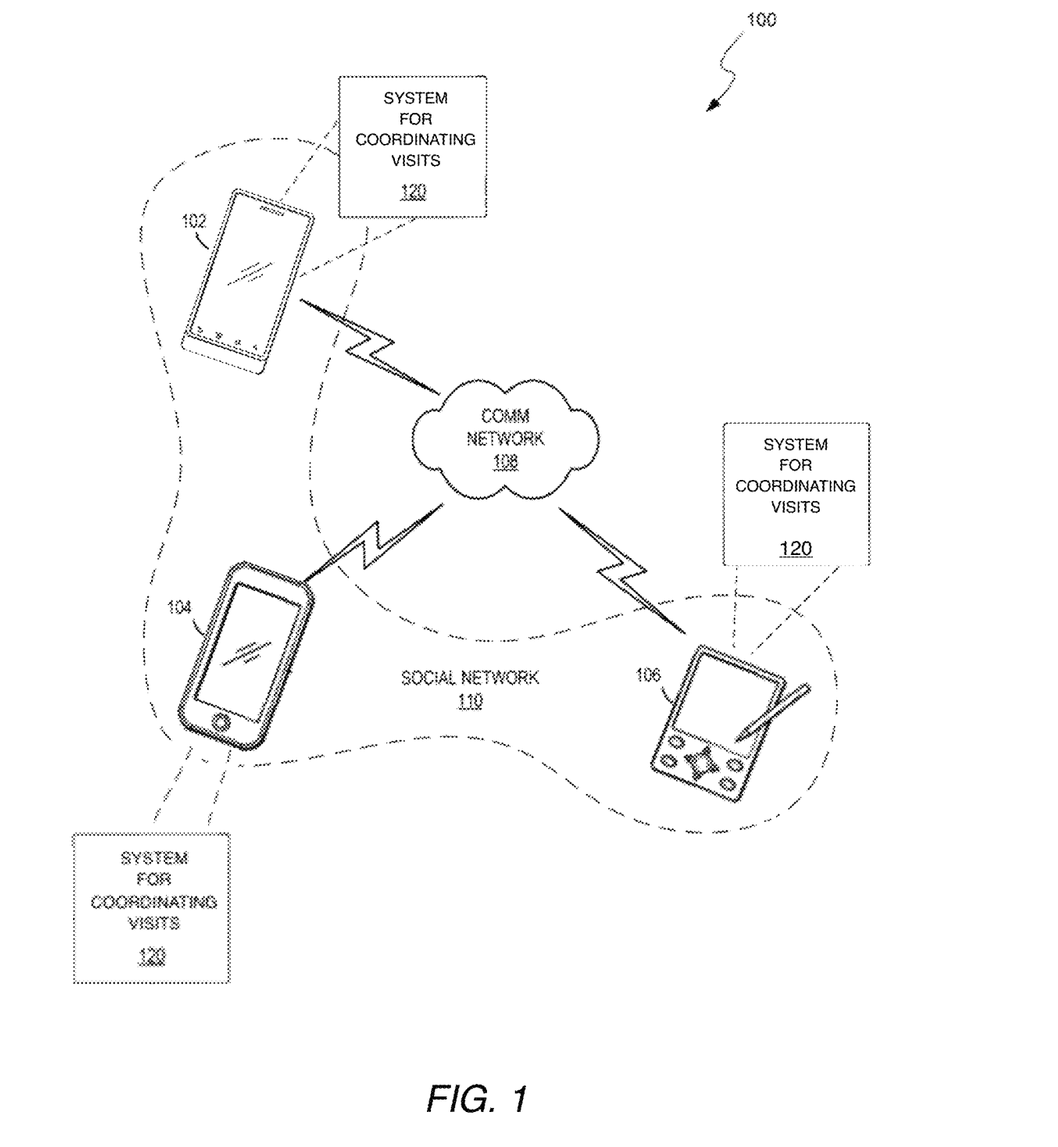
FIG. 1 is a block diagram of a networked environment in which an exemplary embodiment of a system for coordinating visits is implemented.

FIG. 1 illustrates an exemplary embodiment of the system for coordinating visits 100 which includes a plurality of mobile devices communicatively coupled to one another. By way of example, and not limitation, FIG. 1 illustrates three mobile devices 102, 104 and 106 communicatively coupled via a communication network 108. Each of the mobile devices may be embodied as a mobile computing device such as, for example and without limitation, a smartphone or tablet computer that incorporates cellular telephone functionality. Notably, the communications network can use one or more of various communications types such as, for example and without limitation, cellular and Wi-Fi communications.

Users of mobile devices 102, 104 and 106 may create their own private social network 110 centered around a particular individual or group of individuals confined to a medical facility or that are otherwise unable to leave their dwelling place to be around others. These are known as the network center.

The social network 110 enables members to use their devices 102, 104 and 106 to interact with each other. Typically, a social network is facilitated by a website that may require a registration and login prior to use. However, regardless of how such a social network is implemented (be it web-based or not), the functionality of concern involves the ability to provide interaction among a limited group of members, as may be established by the members themselves.

In one embodiment, one way to add a member to a social network by using their device 102 to send an invitation to another user's device 104 inviting them to join the network 110. Sending a network invitation to another member will prompt them to enter identification information such as, by way of example, name and email address. Upon complying with the membership requirements, the new member will be given access, using their mobile device 104, to all of the privileges enjoyed by the first member on their device 102.

In operation, the system 100 provides a better and more coordinated way in which a group of friends and family can maximize the amount of time spent with a disabled loved one and facilitate their desire for ensuring she or he receives the best care. Specifically, the system 100 correlates information that identifies members of the social network 110 with temporal and location information pertaining to visits made to the network center. As a result of such correlating, members of the network can be updated as to whether other members visited a network center along with detailed information about the visit including, but not limited to, when the visit occurred, where, along with media that was created during the visit including pictures, journal entries, and videos.

Furthermore, following the occurrence of a number of predetermined events, the system and method presents a message to the network members suggesting members perform an action. The message is designed to encourage users to perform an act such as visiting their loved one because a prolonged period of time has lapsed during which none of the network members had been detected at their dwelling place.

In this regard, mobile device 102 includes a visit tracking system 100, which can be implemented in numerous ways such as, for example and without limitation, an application executed on the mobile device. In operation, the system 100 receives member information to uniquely identify members of the social network 110 (in this case, users of mobile devices 102, 104 and 106). Additionally, system 100 receives information corresponding to the domicile of a network center. In one embodiment, this information may be collected by a mobile device 102, 104 or 106 from integrated positioning technology, such as a Global Positioning System (GPS). However, it should be noted that various methods of determining the location of a mobile device can be used.

In a further embodiment, a geofence may be created around the domicile so that, any time a mobile device 102, 104 or 106 comes within a predetermined distance of the domicile, the system 100 automatically records the time and date of the occurrence of a visit.

Responsive to determining that a preset amount of time has lapsed without any network member visiting the network center, the system 100 automatically transmits information to members of the network 110. In some embodiments, this information will be followed by a canned prompt appearing on the mobile devices 102, 104, and 106 such as a push notification or text message suggesting that members visit the network center. The message may also be user-defined, by way of example, "Attention Grandma's Family and Friends, it has been [lapsed time period entered here] days since any one of us has paid her a visit. Let's do something about it."

Figure 2:
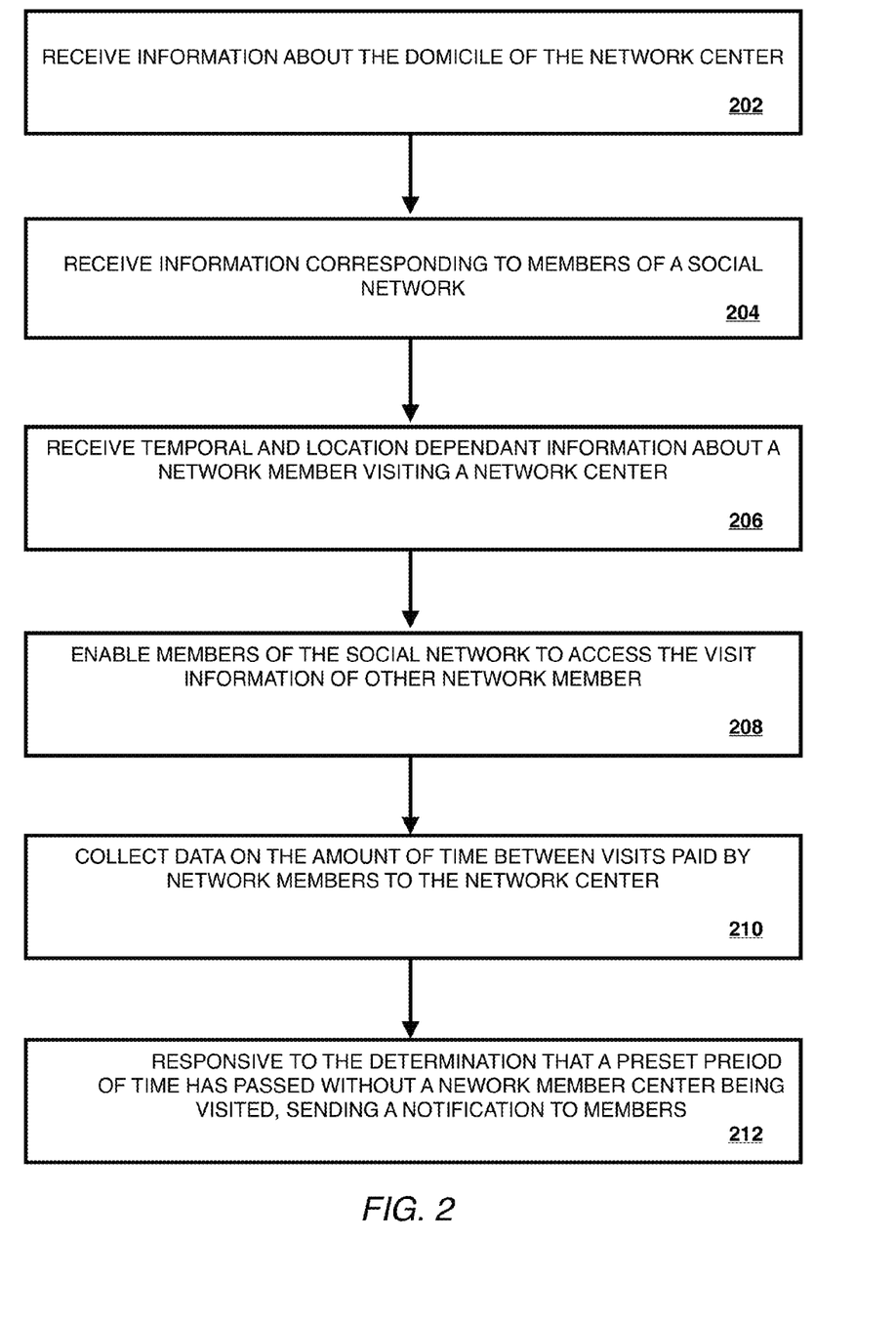
FIG. 2 is a flowchart depicting an exemplary embodiment of method for coordinating visits may be performed by the system shown in FIG. 1.

FIG. 2 is a flowchart depicting an exemplary embodiment of a system and method for coordinating visits such as may be performed by mobile device 102 104, and 106 of FIG. 1. As shown in FIG. 2, the method includes the steps of: receiving member information about the domicile of a network center (block 202); receiving information corresponding to members of a social network (block 204); receiving temporal and location dependent information about a network member visiting a network center (block 206); enabling members of the social network to access the visit information of other network members (block 208); collecting data on the amount of time between visits paid by network members to the network center (block 210); and responsive to the determination that a preset period of time has passed without a network member being recorded at the domicile of the network center, sending a notification to the members of the social network (block 212).

In some embodiments, the visit of a network member to the domicile of the network center can be logged automatically once the mobile device 102, 104 or 106 is detected within a certain proximity of the domicile. In another embodiment, members of the social network may manually record their visit on the mobile device 102, 104 or 106 and this may be viewed by other members of the network 110.

The aforementioned functions can be performed by various components in various embodiments. For example, the functionality can be highly distributed across a network or less so by use of functions performed on local devices such as 102, 104 and 106.

Figure 3:
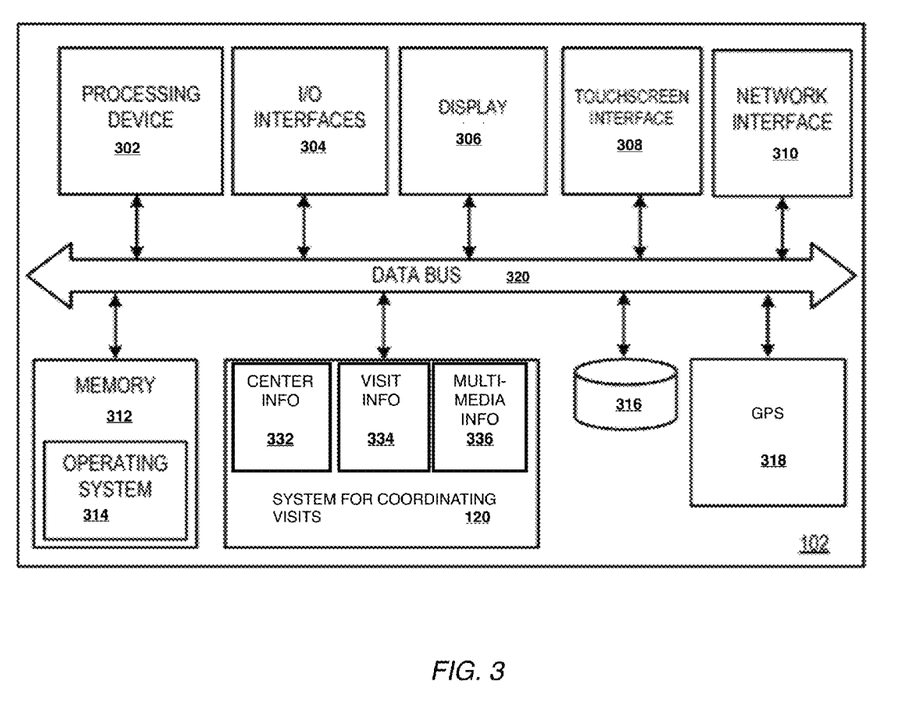
FIG. 3 illustrates an exemplary embodiment of a mobile device shown in FIG. 1.

FIG. 3 illustrates mobile device 102 shown in FIG. 1. As described earlier, mobile device 102 may be a tablet computer or smartphone but may also be embodied in any one of a wide variety of wired and/or wireless computing devices. As shown in FIG. 3, mobile device 102 includes a processing device (processor) 302, input/output interfaces 304, a display 306, a touchscreen interface 308, a network interface 310, a memory 312, and operating system 314, a mass storage 316 and an GPS 318, with each communicating across a local data bus 320. Additionally, mobile device 102 incorporates a system for coordinating visits 100, which is depicted as including network center information 332, member visit information 334 and multimedia information 336, although the location of information 332, 334 and 336 could vary.

The processing device 302 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 312 can include any one of a combination of volatile memory elements (e.g., random-access memory (RAM, such as DRAM, and SRAM, etc.)) and nonvolatile memory elements. The memory typically comprises native operating system 314, one or more native applications, emulation systems, or emulated applications for any of a variety of operating systems and/or emulated hardware platforms, emulated operating systems, etc. For example, the applications may include application specific software which may comprise some or all the components of the mobile device 102. In accordance with such embodiments, the components are stored in memory and executed by the processing device. Note that although depicted separately in FIG. 3, the system and method for coordinating visits 100 may be resident in memory such as memory 312.

Touchscreen interface 308 is configured to detect contact within the display area of the display 306 and provides such functionality as on-screen buttons, menus, keyboards, etc. that allows users to navigate user interfaces by touch. For some embodiments, the mobile device 102 will comprise GPS 318 or other means to determine the location of the mobile device 102.

One of ordinary skill in the art will appreciate that the memory 314 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 3, network interface device 310 comprises various components used to transmit and/or receive data over a networked environment such as depicted in FIG. 1. When such components are embodied as an application, the one or more components may be stored on a non-transitory computer-readable medium and executed by the processing device.

Figure 4:
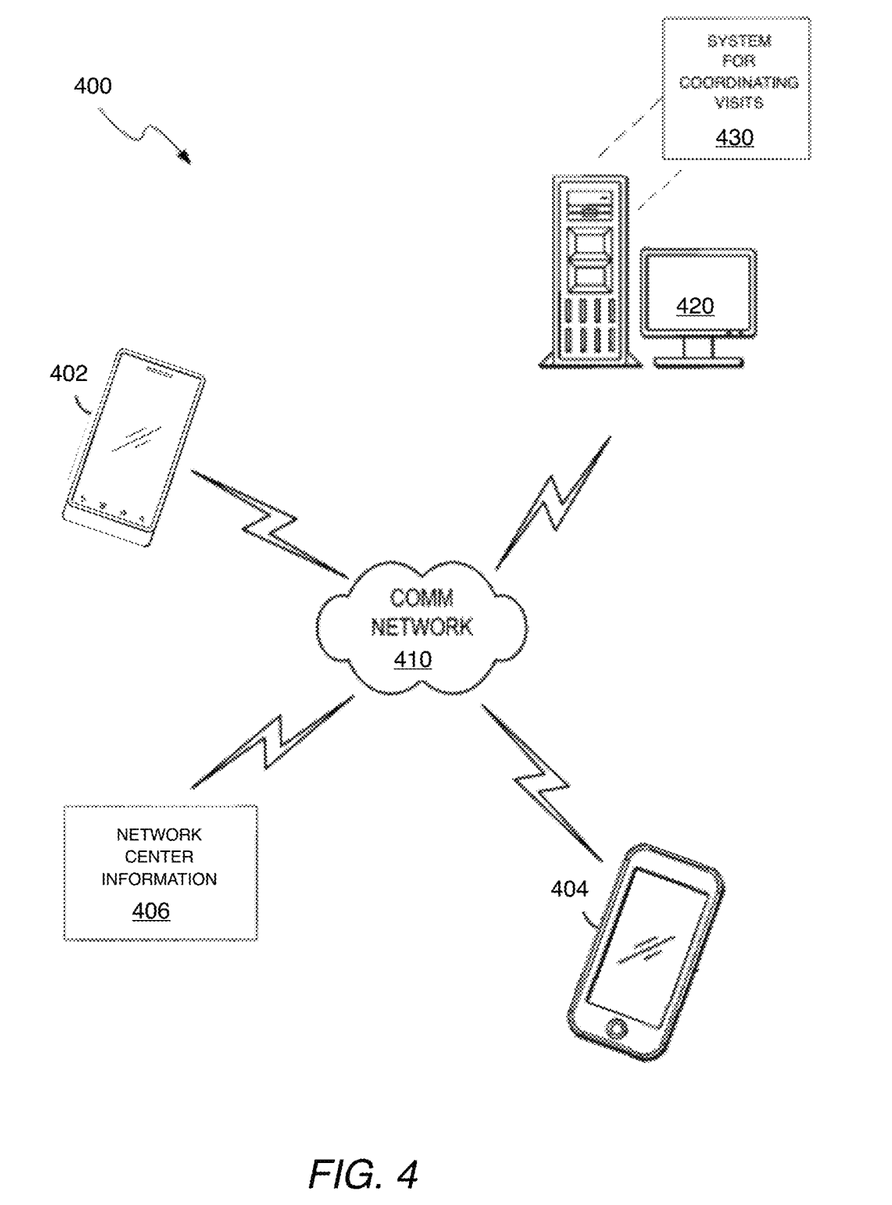
FIG. 4 illustrates an alternative networked environment in which another exemplary embodiment of a system for coordinating visits is implemented.

FIG. 4 is illustrative of an alternative networked environment in which another exemplary embodiment of a system for coordinating visits is implemented. As shown in FIG. 4, system 400 comprises a plurality of mobile devices. By way of example, and not limitation, two mobile devices 402 and 404 are shown communicatively coupled via a communication network 410. Each of the mobile devices may be embodied as a mobile computing device such as, for example and without limitation, a smartphone that incorporates cellular telephone functionality. Notably, the communications network can use one or more of various communications types such as, for example and without limitation, cellular and Wi-Fi communications.

Users of mobile devices 402 and 404 may use their devices to become members of a social network that enables them to interact with each other using their mobile devices 402 and 404 and exchange information pertinent to the aforementioned network center. In this exemplary embodiment, the social network is facilitated by a website that is hosted by social network server 420. As such, server 420 facilitates interaction among a limited group of members, as may be established by the members themselves. For the purpose of the example presented in FIG. 4, the limited group of members includes the users of mobile devices 402 and 404.

Additionally, server 420 implements the system for coordinating visits and facilitates sharing information related to visits with the network center amongst members of the social network. Specifically, the server 420 implements the steps outlined in FIG. 2. Accordingly, member of the social network can access the server 420 using their mobile devices 402 and 404 can obtain information regarding other network members and their visits with the network center as well as receive notifications such as text messages and push notification reminding them when a predetermined period has lapsed when no network member has logged in or been automatically detected within a certain proximity of the network centers domicile.

Figure 5:
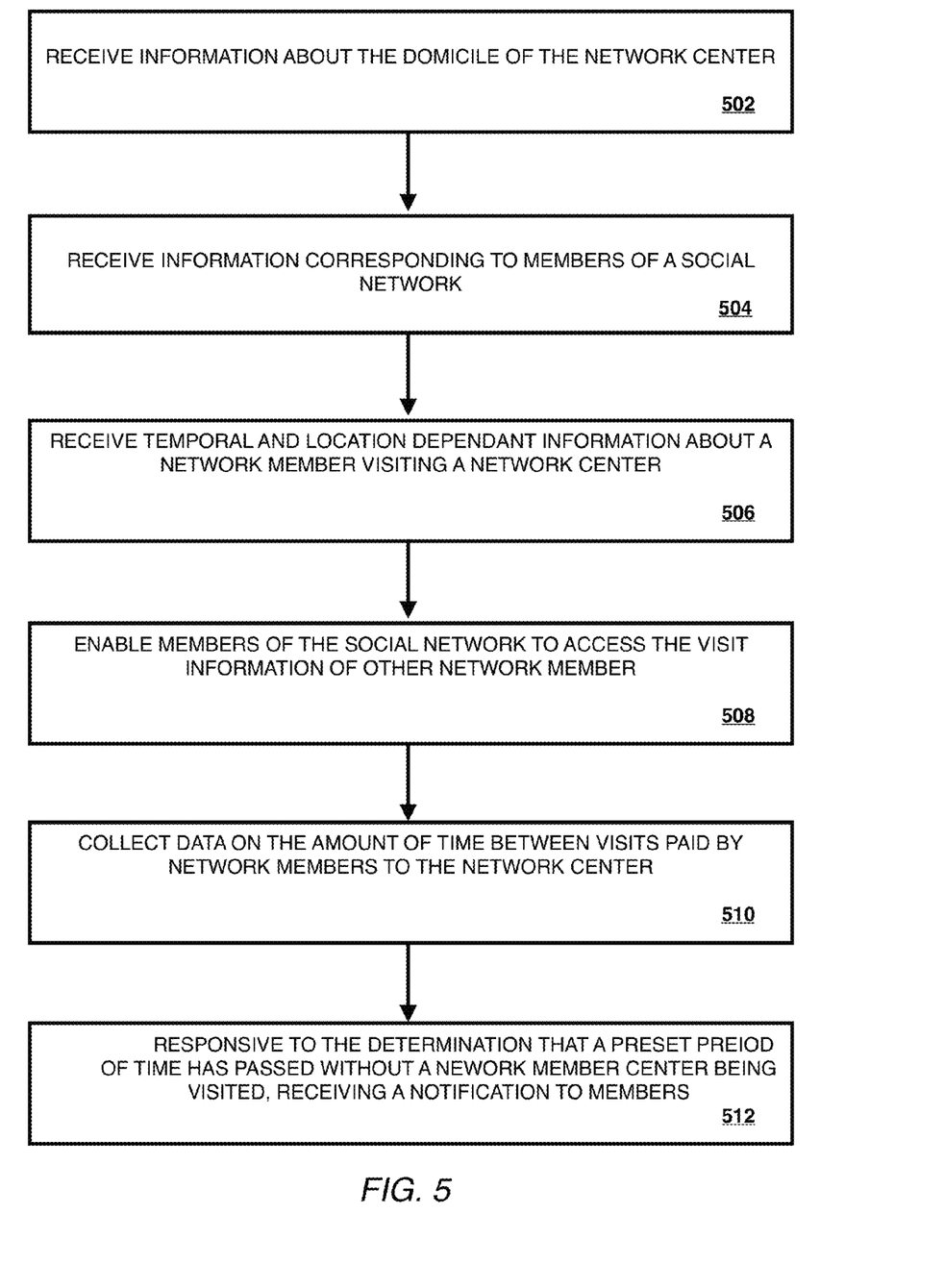
FIG. 5 is a flowchart depicting an exemplary embodiment of how a method for coordinating visits may be performed on one or more mobile devices.

In order to facilitate the aforementioned functionality, various aspects may be performed by one or more of the mobile devices 402, 404. In one embodiment, mobile device is operative to perform, at least in part, the method depicted in the flowchart of FIG. 5. Specifically, this method includes: receiving member information about the domicile of a network center (block 502); receiving information corresponding to members of a social network (block 504); receiving temporal and location dependent information about a network member visiting a network center (block 506); enabling members of the social network to access the visit information of other network members (block 508); collecting data on the amount of time between visits paid by network members to the network center (block 510); and responsive to the determination that a preset period of time has passed without a network member being recorded at the domicile of the network center, receiving a notification from the server 420 (block 512).

Figure 6:
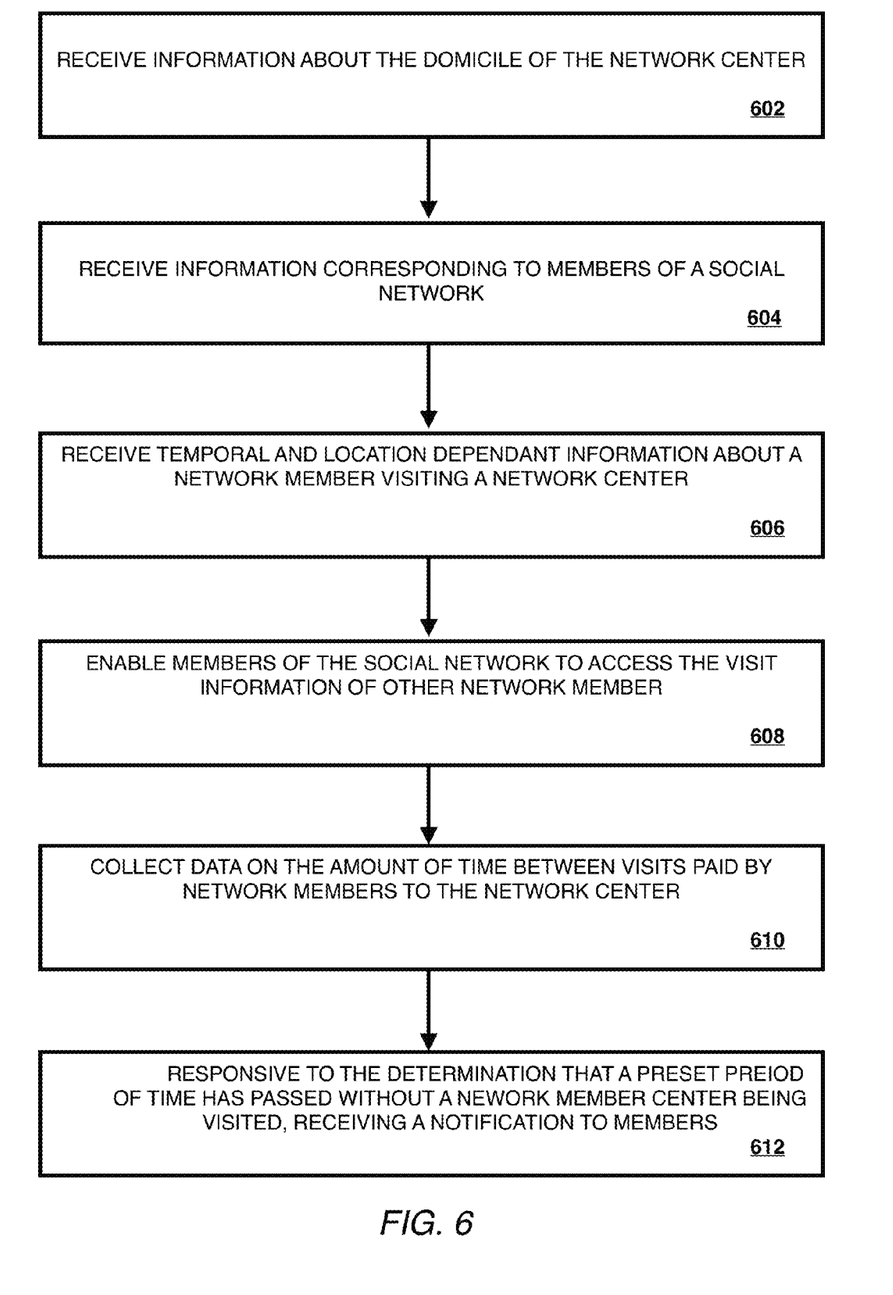
FIG. 6 is a flowchart depicting an exemplary embodiment of how a method for coordinating visits may be performed on a server.

With respect to operation of system for coordinating visits 430, system 430 is operative to perform, at least in part, the method depicted in the flowchart of FIG. 6. Specifically, the method includes: receiving member information about the domicile of a network center (block 602); receiving information corresponding to members of a social network (block 604); receiving temporal and location dependent information about a network member visiting a network center (block 606); enabling members of the social network to access the visit information of other network members (block 608); communicating with mobile devices 302 and 304 transmitting data on the amount of time between visits paid by network members to the network center (block 610); and responsive to the determination that a preset period of time has passed without a network member being recorded at the domicile of the network center, receiving an notification from the server 420 (block 612).

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the mobile device 102, 104, 106, 402 and 404. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 7:
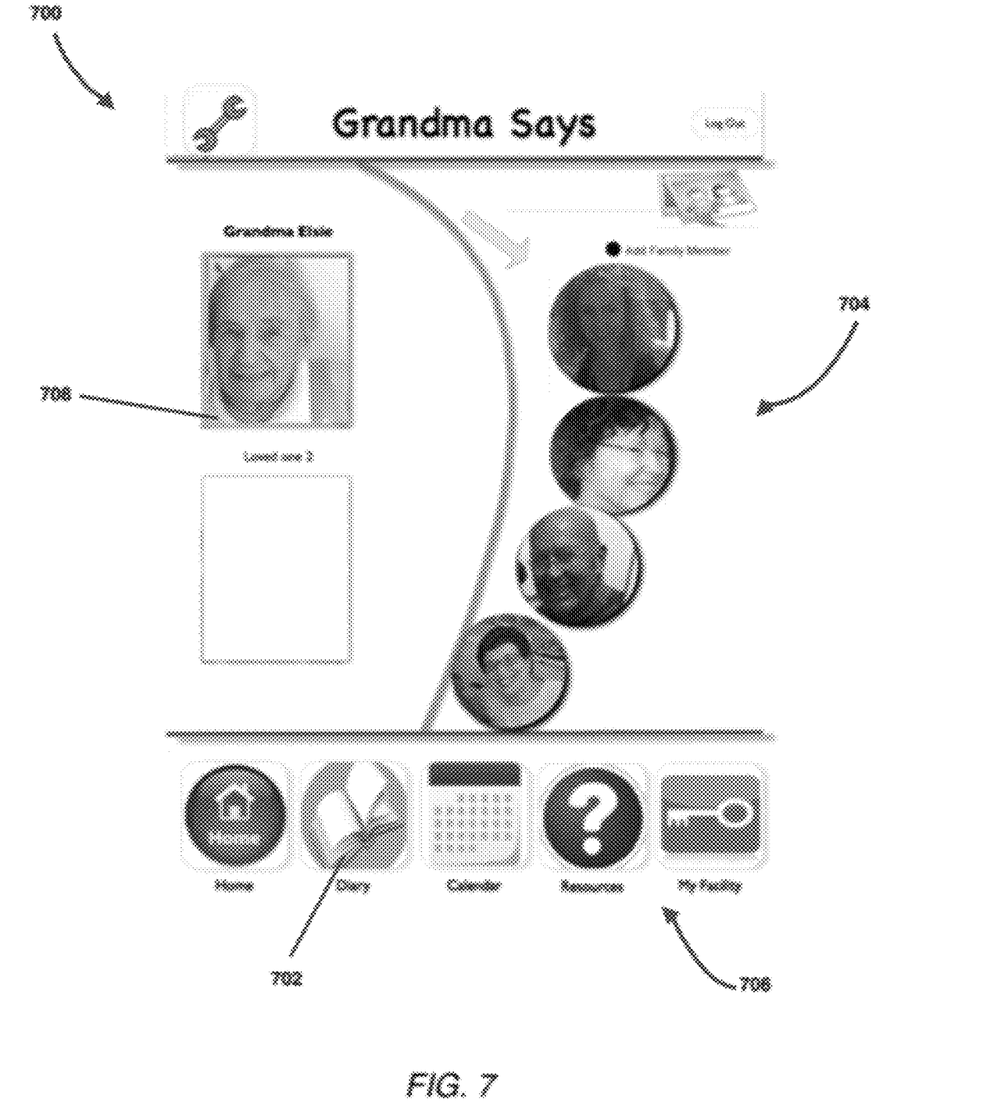
FIG. 7 illustrates an exemplary user interface for the system and method for coordinating visits, according to one embodiment.

FIG. 7 illustrates an exemplary user interface 700 for entering information associated the system and method for coordinating visits, according to one embodiment. According to another embodiment, the system and method provides advanced interactive content to enhance the experience when a network member is visiting the network center. The support of multimedia content, the ease of uploading and downloading of the multimedia content, and the ease of exchanging the multimedia content among the network members makes their experience more enjoyable.

Such content may include a dairy 702 for recording information about the visit, or providing the option to record media such as pictures, sound, and video recordings which may then be shared with other mobile devices subscribed to the social network. Members 704 may share information directly with other members of the social network by setting up a chat. Members may also publish their content on social media-based platforms such as FACEBOOK®, INSTAGRAM®, and TWITTER® and generate a post appearing on a newsfeed page of the social network. The post is generated if the user chooses to publish a particular type of member generated content such as a picture with the network center, voice recording, video, or journal entry. This post may contain simply text telling readers about the network center or various different types of media which may accompany the text.

The system may further provide means of storing information 706 pertinent to the health and well being of the network center 708. Such information includes, but is not limited to, medical information, social services information, and specific information about the healthcare professional or professionals responsible for the care of the network center. It may further comprise pertinent information about what particular facility the network center is domiciled in such as address, visiting hours, telephone numbers, etc.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents

CONCLUSIONS, RAMIFICATIONS, AND SCOPE

While a particular form of the invention has been illustrated and described, it will be apparent that various modifications can be made without departing from the spirit and scope of the invention. For example, the network center may be illustrated as an elderly grandmother in some embodiments even though the inventor contemplates the possibility that the network center may be any number of persons or potentially pets as long as they are unable to leave their place of domicile on their own all the while comprising the properties of the invention. Accordingly, is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being refined herein to be restricted to any specific characteristics, features, or aspects of the system and method for coordinating visits with which that terminology is associated. In general, the terms used in the following claims should not be constructed to limit the system and method for coordinating visits to the specific embodiments disclosed in the specification, unless the above description section explicitly define such terms. Accordingly, the actual scope encompasses not only the disclosed embodiments, but also all equivalent ways of practicing or implementing the disclosed system and method. The above description of embodiments of the system and method for coordinating visits is not intended to be exhaustive or limited to the precise form disclosed above or to a particular field of usage. While specific embodiments of, and examples for, the system and method are described above for illustrative purposes, various equivalent modifications are possible which those skilled in the relevant art will recognize.

While certain aspects of the system and method for coordinating visits are presented below in particular claim forms, the inventors contemplate the various aspects of the system and method in any number of claim forms. Accordingly, the inventor reserves the right to add additional claims after filing the application to pursue such additional claim forms for other aspects of the system and method for coordinating visits.

What is claimed is:

1. A system for coordinating visits, comprising:
   a mobile device operative to:
   receive location information corresponding to the domicile of at least one individual, said domicile is static and defined by a fixed geographic region;
   receive member information corresponding to members of a social network having an interest in the well being of said individual;
   receive temporal information corresponding to a first of the members visiting said domicile; and
   responsive to determining a preset period of time has lapsed and no information is received corresponding to a member of said social network attending said domicile, send information to all members of said social network indicating that said individual has not been visited for the preset period of time.

2. The system of claim 1 wherein said mobile device is further operative to determine a zone of relevance based on the device's distance from said domicile.

3. The system of claim 2 where said mobile device is further operative to determine that the user of said device is within the zone of relevance and automatically log temporal information corresponding to said user visiting said domicile.

4. The system of claim 1, further comprising a social network server operative to link the members of the social network and facilitate communication between the members via web-based interaction.

5. The system of claim 1, further comprising a social network server operative to link the members of the social network and facilitate sharing multimedia content between the members via web-based interaction.

6. The system of claim 1, wherein the mobile device is further operative to automatically provide information to a social network server such that the other members are updated about member visits to said individual via social network server.

7. The system of claim 1, wherein the mobile device is further operative to create the social network by receiving a first profile from a first member comprising a first email address, receiving a second e-mail address from the first member; sending an invitation to the second e-mail address to accept the invitation; a second profile being added to the social network dynamically when the second member accepts the invitation.

8. A method for coordinating visits comprising:
   receiving, at a first mobile device, location information corresponding to the domicile of at least one individual, said domicile is static and defined by a fixed geographic location;
   receiving, at first mobile device, member information corresponding to members of a social network having an interest in the well being of said individual;
   receiving, at first mobile device, temporal information corresponding to a first of the members visiting said domicile;
   receiving, at the first mobile device, information associated with a second mobile device of a second of the members of the social network visiting said domicile, the information associated with the second mobile device being received at the first mobile device via a communication network; and
   responsive to determining a preset period of time has lapsed and no information is received corresponding to a member of said social network attending said domicile, sending information to all members of said social network indicating that said individual has not been visited for the preset period of time.

9. The system of claim 8 further comprising determining a zone of relevance based on the device's distance from said domicile.

10. The system of claim 9 further comprising said mobile device determining that the user of said device is within the zone of relevance and automatically logging temporal information corresponding to said user visiting said domicile.

11. The system of claim 8, further comprising providing a social network server to operative to link the members of the social network and facilitate communication between the members via web-based interaction.

12. The system of claim 8, further comprising providing a social network server operative to link the members of the social network and facilitate sharing multimedia content between the members via web-based interaction.

13. The system of claim 8, further comprising providing a social network server and the mobile device automatically providing information to the server such that the other members are updated about member visits to said individual via the social network server.

14. The system of claim 8, further comprising creating the social network by the mobile device receiving a first profile from the first member comprising a first email address, receiving a second e-mail address from the first member; sending an invitation to the second email address to a accept the invitation; a second profile being added to the social network dynamically when the second member accepts the invitation.

15. A non-transitory, tangible computer-readable medium having stored thereon computer-executable instructions, which, when executed by a computer processor, enable performance of the method comprising:
   receiving, at a first mobile device, member information corresponding to members of a social network;
   receiving, at first mobile device, member information corresponding to members of a social network;
   receiving, at first mobile device, location information corresponding to the domicile of at least one individual wherein said social network is comprised of members having an interest in said individual and wherein said domicile is static and defined by a fixed geographical location;
   receive, at first mobile device, temporal information corresponding to a first of the members visiting said domicile;
   sending, from first mobile device, information to a social network server said temporal information; and
   responsive to determining a present period of time has lapsed and no information is received corresponding to a member of said social network attending said attending said domicile, send server sending notification to all members of said social network indicating that said individual has not been visited for the preset period of time.

* * * * *